United States Patent
Von Schwertfuehrer

(10) Patent No.: US 7,346,445 B2
(45) Date of Patent: Mar. 18, 2008

(54) METHOD FOR OPERATING AN INTERNAL COMBUSTION ENGINE HAVING TORQUE MONITORING

(75) Inventor: Gerit Von Schwertfuehrer, Bieligheim (DE)

(73) Assignee: Robert Bosch GmbH, Stuttgart (DE)

( * ) Notice: Subject to any disclaimer, the term of this patent is extended or adjusted under 35 U.S.C. 154(b) by 68 days.

(21) Appl. No.: 10/551,888

(22) PCT Filed: Mar. 11, 2004

(86) PCT No.: PCT/EP2004/050288

§ 371 (c)(1),
(2), (4) Date: Aug. 21, 2006

(87) PCT Pub. No.: WO2004/088112

PCT Pub. Date: Oct. 14, 2004

(65) Prior Publication Data

US 2007/0168107 A1    Jul. 19, 2007

(30) Foreign Application Priority Data

Apr. 4, 2003  (DE) ................................ 103 15 410

(51) Int. Cl.
*G06G 7/70*  (2006.01)
*G06F 17/00*  (2006.01)
*F02D 41/04*  (2006.01)

(52) U.S. Cl. ....................... 701/103; 701/110; 123/350

(58) Field of Classification Search ........ 701/101–105, 701/110, 111, 115; 123/350, 352
See application file for complete search history.

(56) References Cited

U.S. PATENT DOCUMENTS

| 4,564,908 A * | 1/1986 | Clelford et al. ................ 701/8 |
| 6,032,644 A * | 3/2000 | Bederna et al. ........ 123/339.15 |
| 6,098,593 A | 8/2000 | Aschner |
| 6,251,044 B1 | 6/2001 | Streib |
| 6,285,946 B1 | 9/2001 | Steinmann |
| 6,386,180 B1 * | 5/2002 | Gerhardt et al. ............ 123/350 |
| 7,194,997 B2 * | 3/2007 | Pitzal et al. ................ 123/299 |

FOREIGN PATENT DOCUMENTS

| DE | 195 37 787 | 4/1997 |
| DE | 19742083 A1 * | 3/1999 |
| DE | 199 00 740 | 7/2000 |

\* cited by examiner

*Primary Examiner*—Willis R. Wolfe, Jr.
(74) *Attorney, Agent, or Firm*—Kenyon & Kenyon LLP

(57) ABSTRACT

A method for operating an internal combustion engine, including the following steps: forming a value for a maximum admissible torque, forming a dimension figure for the actual torque and comparing the dimension figure to the value and triggering an error response if the actual torque exceeds the maximum admissible torque. The value for the maximum admissible torque is developed from a first approximation value and an estimated value for the torque contribution of an intervention of a fault regulator. Also, a control unit as well as its use.

10 Claims, 3 Drawing Sheets

METHOD FOR OPERATING AN INTERNAL COMBUSTION ENGINE HAVING TORQUE MONITORING

FIELD OF THE INVENTION

The present invention relates to a method for operating an internal combustion engine having the steps: setting the torque output of the internal combustion engine via a power actuator as a function of the signal from a driver command sender, forming a value for a maximum admissible torque of the internal combustion engine, forming a dimension figure for the actual torque of the internal combustion engine and comparing the dimension figure with that value, and triggering an error response when the actual torque exceeds the maximum admissible torque.

The present invention also relates to a control unit for controlling an internal combustion engine using such methods, as well as a use of such a control unit for controlling an internal combustion engine.

The triggering of the error response is supposed to prevent the internal combustion engine from outputting torque that deviates from the driver command, which, for example, reduces a desired engine braking effect, or may even lead to an undesired accelerating of the internal combustion engine and a vehicle driven by the internal combustion engine.

BACKGROUND INFORMATION

Such a method, such a control unit and such a use are described in German Patent Application No. DE 199 00 740. This document refers to a known torque monitoring for an Otto engine, in which an actual torque of the internal combustion engine is determined from the rotary speed, combustion chamber charge (air mass) and the ignition angle setting. In addition, this document broadens the known torque monitoring to cover internal combustion engines that, at least from time to time, are operated using a lean fuel/air mixture. Examples of such internal combustion engines are Diesel engines and Otto engines having direct injection in an operation having stratified combustion chamber charging. Such internal combustion engines mostly operate unthrottled, so that their combustion chambers are usually charged with a maximum air mass. The torque is then set via the injected fuel mass (quality control), whereas in Otto engines that are operated throttled the torque is set via the mass of the combustion chamber charge with fuel/air mixture (quantity control).

It is proposed in this document, for torque monitoring in connection with a quality controlled internal combustion engine, to determine the actual torque based on the injected fuel mass as the torque-determining variable. In this context, the admissible torque is determined via the driver's command and/or the rotary speed from a characteristics map or by a simplified function model. In this context, the formation of the torque-determining signals for controlling a power actuator takes place in a control unit on a first program level, during the formation of the admissible torque within the scope of a monitoring concept on a second program level.

However, ascertaining the torque from the driver's command, especially in internal combustion engines having fault regulators in transient operation states, especially upon transition into overrun condition, is not reliable, since (admissible) interventions of the fault regulator influence the formation of the control signal for a power actuator. The actual torque that results from the control signal, therefore, has the fault intervention superposed on it. This may lead to detection errors in the usually formed value for the admissible torque.

An internal combustion engine control having a fault regulator is described in German Patent No. DE 195 37 787. The known fault regulator has a D2T2 (dye diffusion thermal transfer) component having operating point-dependent differential time constants and delay constants as parameters. The D2T2 component filters the rotary speed of the internal combustion engine. Its output signal is linked additively with the driver's command-dependently produced control signal for the power actuator. Vibrations of the powertrain, that are perceptible as jerking, are superimposed on the rotary speed as interference. The jerking vibration of the powertrain is damped by the coupling in of the filtered rotary speed signal into the control signal for the power actuator.

Because of the coupling in of the filtered rotary speed signal into the activating signal formation, the jerking vibration images in the control signal for the power actuator, and therewith finally also in the temporal course of the torque actually produced by the internal combustion engine. Jerking vibrations are induced especially by torque changes, as appear, for instance, during transition into overrun condition.

In the following, by overrun condition of an internal combustion engine there is understood an operation in which the internal combustion engine outputs no torque, but rather is driven itself by external influences. Overrun condition appears, for instance, during braking or downhill travel of a motor vehicle, if the driver does not request any torque. The transition into overrun condition may be recorded, for example, by a driver's command sender, for example an accelerator sensor.

The fault regulator intervenes in the control signal formation, particularly during transition into overrun condition, so that the known rotary speed monitoring, that is based on an evaluation of the driver's command is not reliable until the fault regulator intervention has decayed. In this connection it is known per se that one should wait about one second, in response to transition into overrun condition, so as to let the fault regulator intervention decay. The torque monitoring is released only after that. This torque monitoring is therefore not continuous. With that, the disadvantage is connected that a faulty torque generation is discovered only after a delay corresponding to the waiting period. However, for safety reasons it is desirable to detect an undesired generation of torque with the least possible delay, in order to be able to trigger an error response.

SUMMARY OF THE INVENTION

With a view to the related art described, an object of the present invention is to provide a method that makes possible both the damping of jerking and the continuous monitoring of torque.

This object is attained by the method according to the present invention, in that a fault regulator intervention is superimposed upon a control signal of the power actuator, and that the value for the maximum admissible torque is formed from linking a first approximation value to an estimated value for the torque contribution of the fault regulator intervention, the first approximation value being formed as a function of the signal of the driver's command sender.

Furthermore, this object is attained by a control unit that controls such a method or one of the embodiments of the method. The object is also attained by the use of such a control unit for the damping of jerking and for monitoring torque, at least one of the following components being used as a power actuator: a fuel injector device, a throttle valve device, a variable intake valve control, an ignition device.

The computations in the control unit generally take place depending on the physical connection in the torque unit (driver's command torque, torque limitation, . . . ) or unit of quantity or control signal unit (smoke limitation, quantity adjustment control). The connection is made via an engine efficiency characteristics map. Therefore, the considerations described herein for torques are equivalent to corresponding observations on quantities (fuel quantities).

The object of the present invention is completely attained by these features. As a result, the security of the internal combustion engine control is increased by an error response that occurs more rapidly, if necessary.

It is preferred that the fault regulator have a D2T2 component having operating point-dependent parameters.

Such a D2T2 component has proven especially suitable for jerking damping. It is an advantage of the present invention that it can cooperate with such a component, but also with other phase-correcting transmission components and bandpass filters.

It is also preferred that, during the formation of the value for the maximum admissible torque, the estimated value for the torque contribution of the fault regulator interventions is formed by emulating the D2T2 component.

Because of this embodiment, the object is attained in a resource-saving manner. In contrast to the possibility of functionally identically duplicating the complete fault regulator having operating point-dependent time constants, this embodiment requires less storage space and computing time (program running time) in the control unit.

It is also preferred that, in the formation of the dimension figure for the actual torque, the controlled variable actually output by the power actuator is taken into account.

Because of this embodiment, the simplified reproduction may so-to-speak be provided with limitations that are set by the real fault regulator.

Furthermore, it is preferred that the controlled variable that is actually output by the power actuator is taken into consideration by an extreme selection, in comparison to a duplicated controlled variable.

This embodiment has the effect that extremal values created during the simplified duplication may be excluded by additional processing.

It is preferred moreover that the result of the extremal selection, as in the preceding paragraph, is compared to a fixed value by an additional extremal selection.

This embodiment supplies the additional advantage that further processing may, for example, be limited to positive values, so as not to reduce the admissible torque too much. This prevents an excessive sensitivity in fault detection that might otherwise occur.

Then again, it is preferred that the estimated value of the torque contribution of the fault regulator intervention is formed by access to a characteristics curve that is addressed using the second derivative with respect to time of the rotary speed of the internal combustion engine.

This alternative represents a particularly simple and resource-saving alternative to the above named embodiments.

It is also preferred that, during transition into overrun condition of the internal combustion engine, an error response without waiting time may be triggered.

This minimizes the speed with which a torque monitoring, that is active during the operation of the internal combustion engine, is able to trigger a fault response.

DETAILED DESCRIPTION

Figure 1:
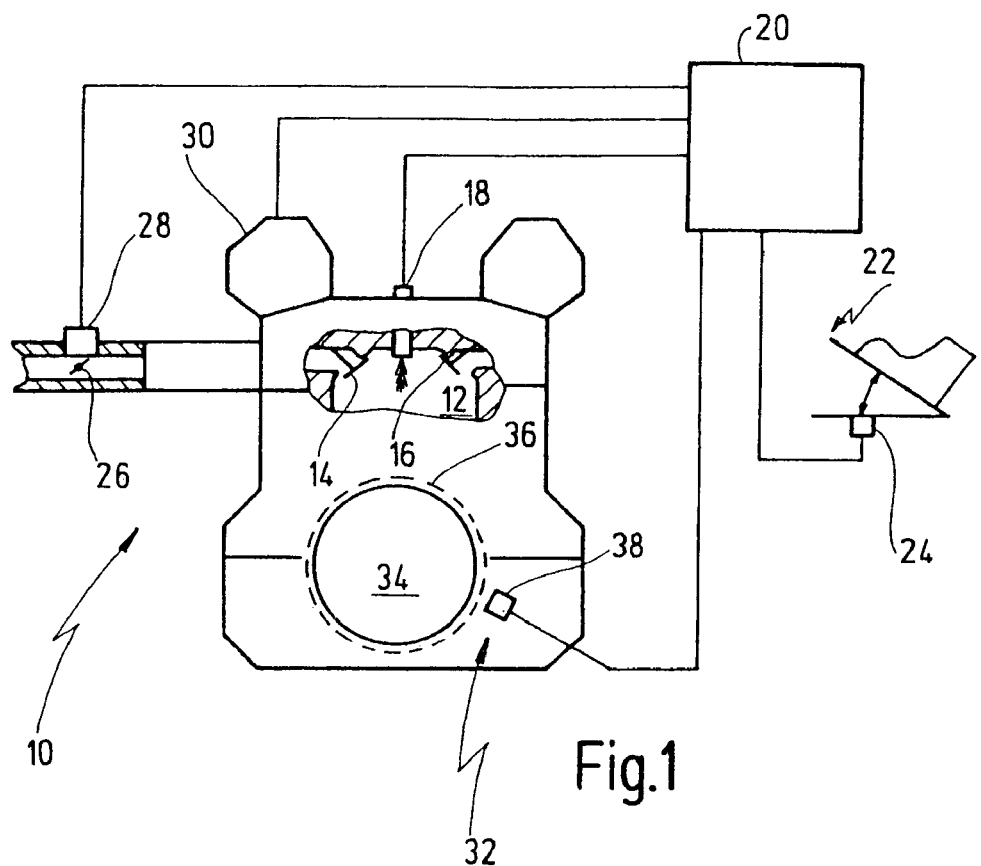
FIG. 1 shows, in schematic form, an internal combustion engine having actuators, a sensor system and a control unit.

The number 10 in FIG. 1 designates the overall view of an internal combustion engine shown schematically, having at least one combustion chamber 12. A charge of combustion chamber 12 is replaced via an inlet valve 14 and a discharge valve 16. Fuel is metered to an air charge of combustion chamber 12 via a fuel injector 18, the point in time of the metering and the metered quantity being controlled by a control unit 20. In this context, fuel injector 18 is used as a power actuator. The quantity metered in determines quite essentially the torque produced by internal combustion engine 10. The activation of the power actuator takes place, among other things, as a function of a driver command which, via an accelerator 22, is recorded by an accelerator sensor 24 and passed on to control unit 20.

Such power control is typical for a Diesel engine. A comparable power control via the quantity of the fuel metered in is also used in an Otto engine having direct injection in an operation having stratified combustion chamber charging. As opposed to the Diesel engine, in which the injection triggers the combustion, in the Otto engine there is spark ignition of the combustion chamber charge, using a spark plug, for example.

In an Otto engine having direct injection, which is operated in homogeneous operation, that is, having homogeneous mixture distribution in combustion chamber 12, the setting of the desired torque takes place as a function of the driver command via the quantity of the charge of combustion chamber 12 (quality regulation). By analogy, this is true also for an internal combustion engine having manifold injection.

In these cases, the quantity of combustion chamber charge may be set via a throttle valve 26, which is operated by a throttle valve actuator 28 in a controlled manner by control unit 20. Throttle valve 26, in conjunction with throttle valve actuator 28, is then used as a power actuator. Alternatively, the quantity of the charge of combustion chamber 12 may also be controlled via a variable activation of intake valve 14 by an intake valve actuator 30, which is also activated by control unit 20. Internal combustion engine 10 also has a rotary speed sensor system 32, which may be made up, for example, of a pulse-generating wheel 34 having ferromagnetic markings 36 and an inductive sensor 38.

Figure 2:
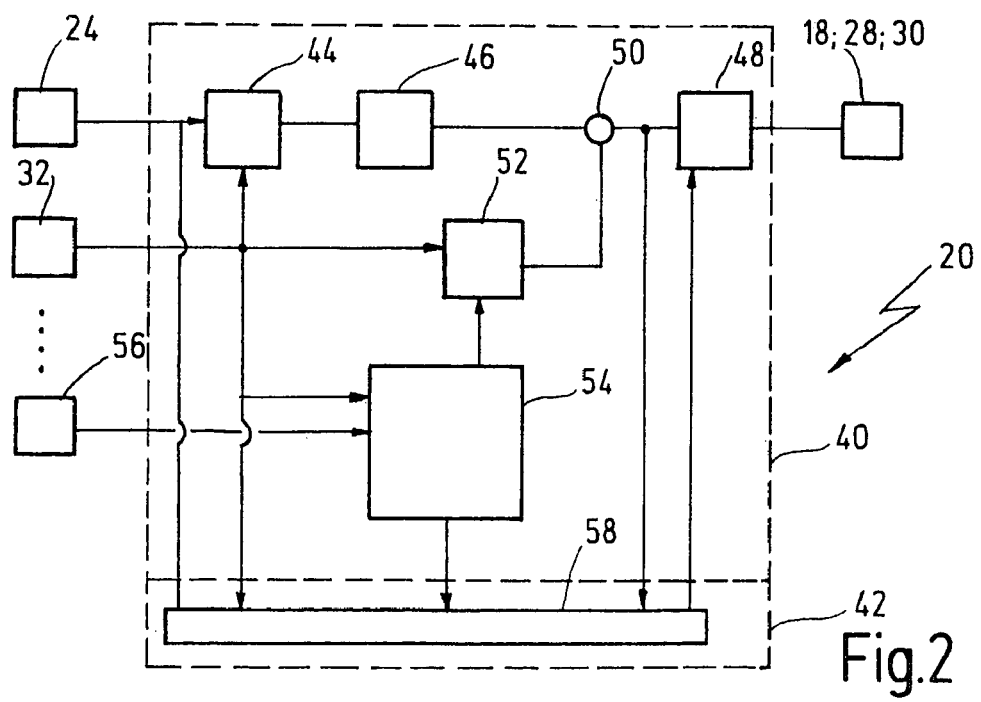
FIG. 2 shows a control unit having a sensor system and an actuator in block diagram representation.

As shown in FIG. 2, control unit 20 has a first level 40 and a second level 42, these levels 40, 42 corresponding in the block diagram representation of FIG. 2 to program levels of an engine control program. The actual control program runs on first level 40, on which, from signals of an input-end sensor system 24, 32 and 56, controlled variables for the output-end control of actuators, such as power actuators 18, 28 and 30 are formed. Second level 42 is used for monitoring the engine control. For this, it is also supplied with signals of the input-end sensor system 24, 32, 56. From this, and possibly from additional signals received from the first level, the second level forms signals for monitoring the first level. In the case of an error, it may intervene in the first level and produce a fault response there.

On the first level, first of all, a setpoint value is generated from the signals of accelerator sensor 24 and rotary speed sensor system 32 for the torque to be generated by internal combustion engine 10, and/or a corresponding base value for actuator activation. This signal is subsequently filtered in a control signal-forming element 46 in order, for example, to smooth out abrupt changes in the accelerator setting (the driver command) before the activation of the actuator. control signal-forming element 46 may be implemented as a low-pass, for instance a PT1-component. This smoothing is performed in order to damp abrupt load changes that could generate vibrations in the powertrain. For damping such powertrain vibrations (damping of jerking) the signal of rotary speed sensor system 32 is supplied to a fault regulator 52, which forms a correction signal from it that is linked to the smoothed base value from block 46 in block 50. The fault regulator works as a phase-correcting/phase-shifting member, and therefore it emits a signal that is phase-shifted with respect to the signal of the control signal-forming element. The linking may be multiplicative as well as additive. The output signal of linkage 50 is converted in a block 48 to produce final activating signals for at least one of actuators 18, 28 or 30, and is output to these actuators.

Fault regulator 52 is preferably implemented as a D2T2 filter. Its transmission function, as a function of the complete frequency variable s, is then:

$$\text{output signal}(s)/\text{rotary speed}(s) = k \times s^2 / (1 + t \times s)^2,$$

where k is the amplification (the constant of the D proportion) and T is the time constant of the deceleration portion. The variable s is the frequency. From the D2T2 filtering (phase shifting) of the rotary speed signal, one obtains an activating signal component that damps the jerking of the powertrain, which is, in the manner already described, linked in linkage 50 to the filtered base value for the activation of the actuator.

Since the amplitude and the frequency of jerking vibrations in motor vehicles are very much dependent on the operating point, one should not expect satisfactory results for all operating points by using fixed filter constants K, T. According to experience, the jerking vibration is strongly influenced by the respectively present transmission ratio step in the transmission and by the engine's rotary speed. Therefore, fault regulator 52 is supplied with operating point-dependent parameters K, T, with the aid of a parameter selection in block 54. For the selection of operating point-dependent parameters, at least one signal of rotary speed sensor system 32 and an additional signal of a sensor system 56 are supplied to block 54, from which the stage of the transmission, that was just inserted, may be determined. The signal of sensor system 56 may, for instance, be a driving speed signal v, so that from v and rotary speed n the transmission ratio and thereby the transmission ratio stage may be determined.

For checking and monitoring the activating signal, formed on the first level, for actuators 18, 28 and 30, on second level 42, in monitoring block 58, a value is formed for a maximum admissible activating signal. The value, formed in monitoring block 58, for an admissible activating signal corresponds to a maximum admissible torque. This value is formed in block 58 from signals of driver command sender 24, rotary speed sensor system 32 and, if necessary, from control signals of the first level, such as values of certain parameters K, T for fault regulator 52 which are made available by parameter selection 54. The output signal, formed on first level 40, of linkage 50 corresponds to a dimension figure for the actual torque of the internal combustion engine. This value is supplied to monitoring block 58, so that in block 58 there are present values for the maximum admissible torque and for the actual torque. If the result of a comparison of the actual activating duration (or of the actual torque) to the value for a maximum admissible activating signal (or a maximum admissible torque) is that the actual activating signal (torque) is becoming too great, monitoring 58 triggers a fault response by, for instance, preventing, blocking or changing the final activating signal formation in block 48.

Figure 3:
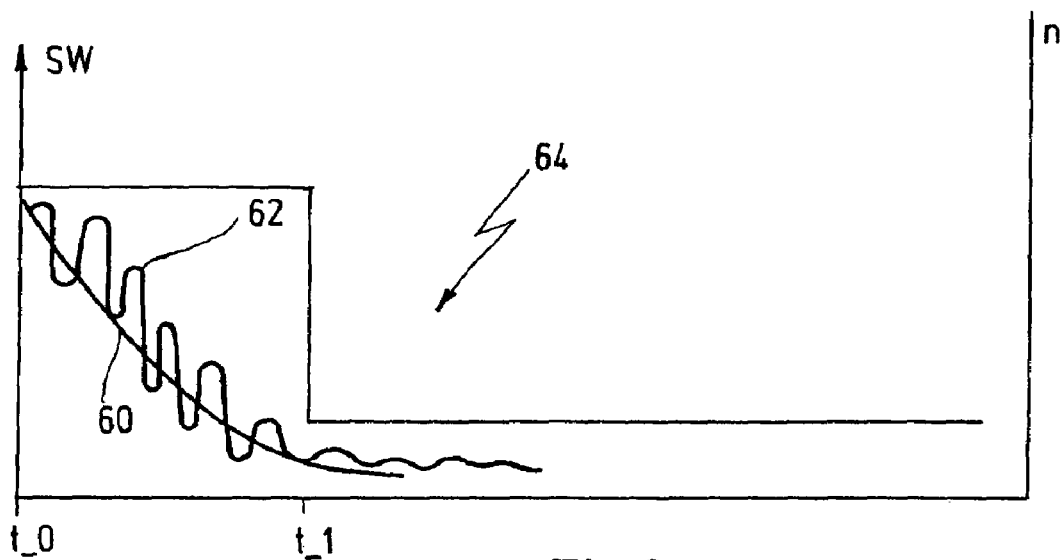
FIG. 3 shows a curve over time of signals in the control unit.

FIG. 3 shows curves over time of signals in control unit 20 to illustrate the technical background of the present invention. In this context, at point t_0, a transition into overrun condition is triggered by accelerator sensor 24. Because of that, the output signal of setpoint value control 44 in FIG. 2 changes more or less abruptly. This abrupt change is smoothed by control signal-forming element 46, which emits monotonically declining output signal 60 shown in FIG. 3. The load change excites powertrain vibrations, which are reflected in the signal of rotary speed sensor system 32. Via fault regulator 52, the filtered rotary speed signal of the activating signal formation is given negative feedback, in a certain sense, by linkage 50. In the last analysis, the jerking vibration is reflected thereby in the formation of the activating signal for actuator 18, 28 and 30. In this context, the phase relation between the oscillation in the activating signal and the actual jerking vibration by the D2T2 filtering in fault regulator 52 is such that the jerking vibration is damped. Oscillating curve 62 in FIG. 3 shows, in a certain sense, the output signal of linkage 50, that is, the output signal of control signal-forming element 46 superposed by an intervention of fault regulator 52.

By the oscillation in curve 62, monitoring threshold values, that have a fixed offset to signal 60, could be exceeded. For this reason, according to the related art, upon the occurrence of oscillations in signal 62, torque monitoring does not take place. As may be seen in FIG. 3, the oscillation in signal 62 decays with increasing time, so that, approximately beginning at time t_1, an activating signal curve is present again which is accessible to the known monitoring. In the known monitoring, these relationships are taken into consideration in that the torque monitoring, especially the safety-critical overrun condition monitoring (torque monitoring in overrun operation) is deactivated in the time span between t_0 and t_1. This time span of the decaying of the oscillation in the activating signal has a length of the order of magnitude of one second.

Figure 4:
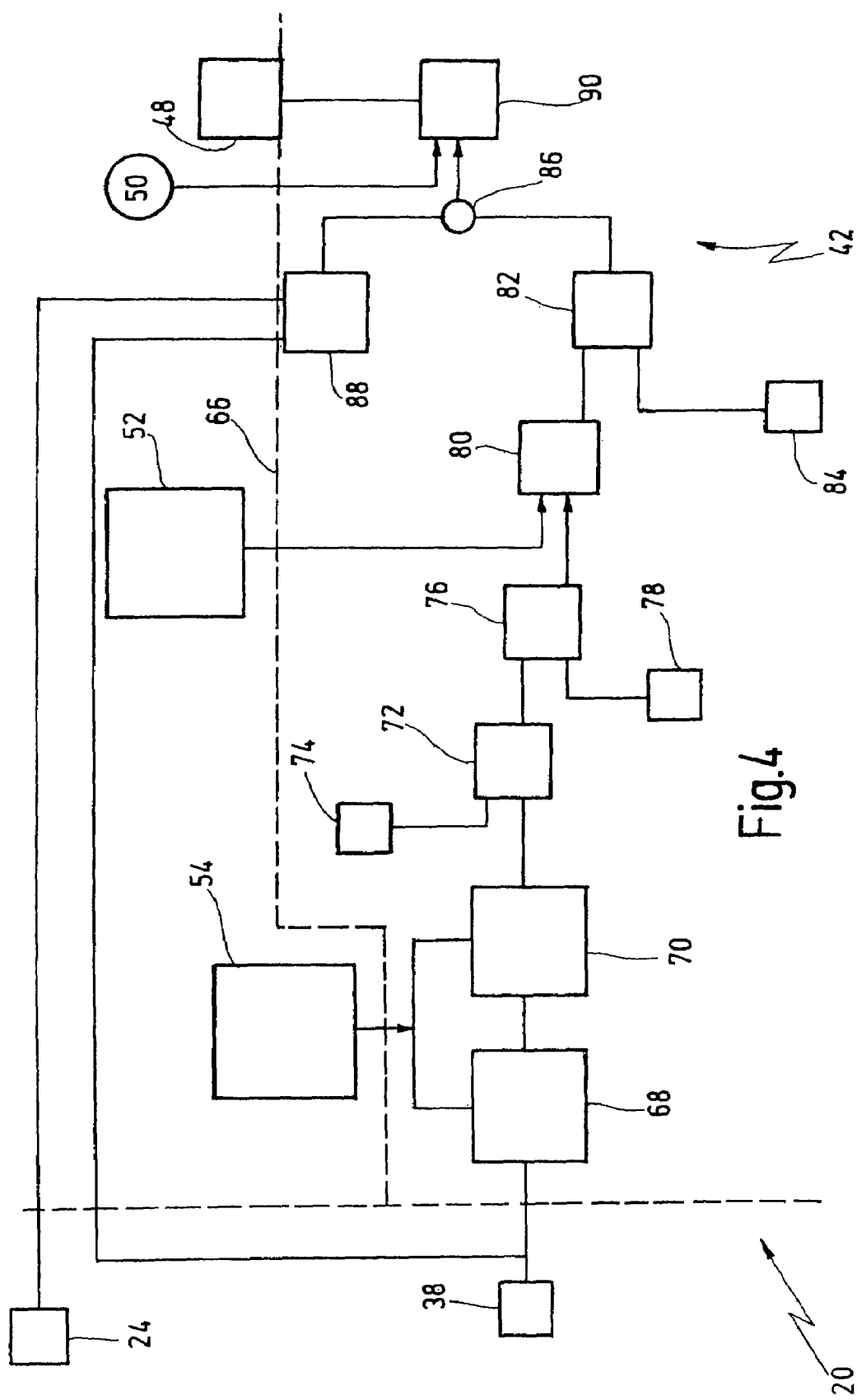
FIG. 4 shows an exemplary embodiment of the present invention as a block diagram representation.

Together with a view of FIG. 4, it will be explained below, within the scope of an exemplary embodiment of the present invention, how this undesired waiting period may be avoided. FIG. 4 essentially shows the functional procedure of second level 42 of control unit 20, or rather its program structure, in greater detail. In addition, FIG. 4 shows how first level 40 and second level 42 interact with each other. The signal of inductivity sensor 38 of rotary speed sensor system 32 is supplied in control unit 20 to an in-series connection of two DT1 components 68 and 70. To the two DT1 components 68, 70 in level 2, extremal values of amplification constant K and time constant T of D2T2 component from the first level are supplied by parameter selection 54 in FIG. 1. In this context, the extremal values represent in each case values that lead to extreme activating signals and, thus, torques. In other words, in level 2, the D2T2 component from level 1 is duplicated in simplified form, the simplification relating to the use of fixed parameters K, T that lead to extreme values of the torque.

The output signal of the D2T2 component from level 1, duplicated by blocks 68 and 70, is subsequently processed further by four successive extremal value selections. In this context, the output signal of block 70, in a first extremal selection of block 72, is limited to an upper value that is plausible as to its absolute value, that is made available by block 74. In the second extremal value selection of block 76, there subsequently takes place an absolute value limitation to a lower plausible limiting value. An additional extremal value selection in block 80 is post-connected to this limitation to a lower limiting value. To block 80 are supplied the intervention formed on the first level by fault regulator 52 and the output signal of block 76. Block 80 selects the smaller value in absolute amount from these two values. Subsequently, there takes place an additional extremal value selection in a block 82, in which the output value of block 80 is compared to a fixed value that is made available by block 84. This fixed value is preferably 0. By this fixed value 0 one may distinguish between torque increasing and torque decreasing interventions by fault regulator 52. Within the scope of monitoring, since one is only interested in the detection of torque-increasing influences, one may, so to speak, segregate out the uninteresting contributions of fault regulator 52 by the extremal value selection in block 82.

The value formed by these four extremal value selections 72, 76, 80 and 82 is subsequently linked in linkage 86, as the estimated value for the torque contribution of the intervention of fault regulator 52, to a first approximation value for the maximum admissible torque, which is made available by block 88. Block 88 on level 2 receives signals of accelerator sensor 24 and inductivity sensor 38, and, using these input signals, emulates the behavior of setpoint value control 44 and control signal-forming element 46 from level 1. In other words: in block 86, an estimated value for the torque contribution of the intervention of fault regulator 52 is superimposed on this first approximation value. The result of the superimposition is compared in block 90 to a dimension figure for the actual torque of the internal combustion engine from level 1. This dimension figure may, for instance, be the value which is made available in level 1 by linkage 50. If, in block 90, the dimension figure for the actual torque exceeds the value for a maximum admissible torque, block 90 triggers a fault response via a connection to activating signal formation 48, such as a limitation or a blocking of activating signal formation.

For further illustration, in the following we assume that linkage 86 represents a subtraction in which the output signal of block 82 is subtracted from the first approximation value, which is emitted by block 88. Measured in arbitrary units, say that the output signal of block 70 is −2, for example. On level 1, such a negative output value of fault regulator 52 would lead to a reduction in the activating signal for power actuators 18, 28 or 30. Using the adopted sign convention, the extremal value selection in block 72 corresponds to a maximum value selection. To this maximum value selection there is then supplied, for instance, the value −3 as the upper plausible boundary. Consequently, block 72 selects the value −2 from the two quantities −3 and −2 and passes this on to block 76. Using the selected sign convention, block 72 corresponds to a minimum value selection. As a plausible value for a lower boundary of the fault regulator intervention, block 78, for example, makes available the value −1 for block 76. Block 76 selects the minimum value −1 from the values −2 and −1 present, and passes this on to block 80, which at this sign convention is implemented as a maximum value selection.

Let us say that fault regulator 52 from FIG. 1 supplies the value −1 to block 80. Block 80 selects the maximum −1 from the values −1 and −2 present. In this way the estimated value for the intervention of fault regulator 52, as it is developed as an estimated value on level 2, is limited to the actual value as it is developed on level 1. This increases the sensitivity of the monitoring. After that, there takes place in block 82 an additional minimum value selection. For this, a block 84 makes available to block 82 a fixed value, preferably the value 0. Therefore, block 82 selects the value −1 from the values −1 and 0 that are present. This value −1 is subtracted in linkage 86, and is thereby added in absolute value. The absolute value added thus represents an offset which is superimposed on the approximation value from block 88 in order to make available a threshold value for block 90.

Figure 5:
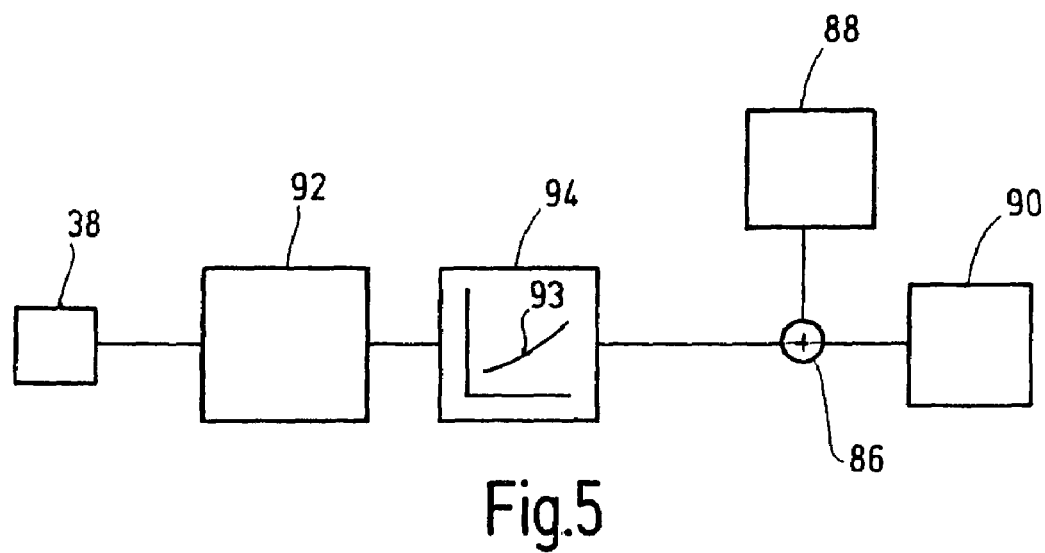
FIG. 5 shows an alternative exemplary embodiment.

FIG. 5 shows a more simplified alternative for estimating the intervention torque of fault regulator 52. For this, the output signal of inductive sensor 38 of rotary speed sensor system 32 in block 92 is differentiated twice with respect to time. The second time differential thus formed of the rotary speed is used for addressing a characteristics curve 93 in block 94, which supplies the maximum fault regulator intervention torque by which the admissible torque of level 2 is increased.

Correspondingly, the maximum fault regulator intervention torque, emitted by block 94, is added, in linkage 86, to a first approximation value which, as described above, was formed on level 2 based on signals of rotary speed sensor system 32 and of the driver's command. The sum is subsequently transferred to a block 90, which has the same function as block 90 in FIG. 4

What is claimed is:

1. A control unit for controlling an internal combustion engine, comprising:
    means for setting a torque output of the internal combustion engine via a power actuator as a function of a signal of a driver's command sender;
    means for forming a value for a maximum admissible torque of the internal combustion engine;
    means for forming a dimension figure for an actual torque of the internal combustion engine and comparing the dimension figure to the value for the maximum admissible torque;
    means for triggering an error response if the actual torque exceeds the value for the maximum admissible torque; and
    means for superimposing an intervention of a fault regulator on an activating signal of the power actuator,
    wherein the value for the maximum admissible torque is formed from a linking of a first approximation value to an estimated value for a torque contribution of the intervention of the fault regulator, the first approximation value being formed as a function of the signal of the driver's command sender.

2. The control unit according to claim 1, wherein the power actuator includes at least one of the following components: a system of fuel injectors, a throttle actuator in connection with a throttle valve, a variable intake valve control, and an ignition system.

3. A method for operating an internal combustion engine, comprising:
- setting a torque output of the internal combustion engine via a power actuator as a function of a signal of a driver's command sender;
- forming a value for a maximum admissible torque of the internal combustion engine;
- forming a dimension figure for an actual torque of the internal combustion engine and comparing the dimension figure to the value for the maximum admissible torque;
- triggering an error response if the actual torque exceeds the value for the maximum admissible torque; and
- superimposing an intervention of a fault regulator on an activating signal of the power actuator,
- wherein the value for the maximum admissible torque is formed from a linking of a first approximation value to an estimated value for a torque contribution of the intervention of the fault regulator, the first approximation value being formed as a function of the signal of the driver's command sender.

4. The method according to claim 3, wherein the estimated value for the torque contribution of the intervention of the fault regulator is formed by access to a characteristics curve addressed using a second derivative of a rotary speed of the internal combustion engine with respect to time.

5. The method according to claim 3, further comprising triggering an error response without waiting time during a transition into an overrun condition of the internal combustion engine.

6. The method according to claim 3, wherein the fault regulator has a D2T2 component having operating point-dependent parameters.

7. The method according to claim 6, wherein, during the formation of the value for the maximum admissible torque, the estimated value for the torque contribution of the intervention of the fault regulator includes an emulating of the D2T2 component using fixed parameters.

8. The method according to claim 3, wherein, during the formation of the value for the maximum admissible torque, an actual controlled variable output by the power actuator is taken into consideration.

9. The method according to claim 8, wherein the actual controlled variable output by the power actuator is taken into consideration by an extremal value selection in comparison to an emulated controlled variable.

10. The method according to claim 9, further comprising comparing a result of the extremal value selection to a fixed value by an extremal value selection.

* * * * *